(12) United States Patent  
May (10) Patent No.: US 7,293,636 B2
(45) Date of Patent: Nov. 13, 2007

(54) ELECTRONICALLY CONTROLLED VISCOUS FAN DRIVE HAVING CAST CHANNELS

(75) Inventor: James P. May, Jackson, MI (US)

(73) Assignee: BorgWarner Inc., Auburn Hills, MI (US)

( * ) Notice: Subject to any disclaimer, the term of this patent is extended or adjusted under 35 U.S.C. 154(b) by 310 days.

(21) Appl. No.: 11/170,828

(22) Filed: Jun. 30, 2005

(65) Prior Publication Data

US 2006/0243554 A1 Nov. 2, 2006

Related U.S. Application Data

(60) Provisional application No. 60/676,711, filed on May 2, 2005.

(51) Int. Cl.
*F16D 31/00* (2006.01)
(52) U.S. Cl. .................. 192/58.61; 29/428; 29/469; 123/41.11; 192/112
(58) Field of Classification Search .................. None
See application file for complete search history.

(56) References Cited

U.S. PATENT DOCUMENTS

| | | | |
|---|---|---|---|
| 3,498,431 A | 3/1970 | Sutaruk | |
| 3,809,197 A | 5/1974 | Clancey | |
| 4,004,668 A | 1/1977 | Blair | |
| 4,310,085 A | 1/1982 | LaFlame | |
| 4,383,597 A | 5/1983 | Blair | |
| 4,924,984 A | 5/1990 | Kennedy | |
| 5,113,987 A | 5/1992 | Drennen et al. | |
| 5,113,989 A | 5/1992 | Feigler | |
| 5,125,491 A | 6/1992 | Takikawa et al. | |
| 5,193,125 A | 3/1993 | Mahoney | |
| 5,433,304 A | 7/1995 | Bojas | |
| 5,497,868 A | 3/1996 | Ohhara | |
| 6,021,747 A * | 2/2000 | Gee et al. | 123/41.12 |
| 6,725,813 B1 | 4/2004 | Boyer | |
| 6,752,251 B2 | 6/2004 | May et al. | |
| 2002/0005328 A1 | 1/2002 | Heinie et al. | |
| 2006/0243554 A1* | 11/2006 | May | 192/58.61 |

FOREIGN PATENT DOCUMENTS

JP 407 190 090 A 7/1995

* cited by examiner

*Primary Examiner*—Saul Rodriguez
(74) *Attorney, Agent, or Firm*—John Artz PC (57) ABSTRACT

An electronically-controlled viscous fan drive in which the output drive to the fan is electronically controlled by the movement of viscous fluid from a fluid reservoir and into the operating and working chamber of the coupling during normal operation. A radially balanced valve disk coupled to a spring controls the relative movement of viscous fluid from a fluid reservoir to the working chamber by sealingly engaging and disengaging a fill hole fluidically coupling the fluid reservoir to the working chamber. The clutch plate and cover and body, along with the features defined between the clutch plate and cover and body are cast to the desired size and shape, therein allowing easier and more precise manufacturing and more cost effective manufacturing as compared with traditional designs that are stamped and having machined-in features.

20 Claims, 4 Drawing Sheets

ELECTRONICALLY CONTROLLED VISCOUS FAN DRIVE HAVING CAST CHANNELS

RELATED APPLICATION

The present application claims priority from U.S. Provisional Application No. 60/676,711, filed on May 2, 2005. The present invention is related to U.S. Pat. No. 6,752,251, filed on Nov. 4, 2002, and entitled "Electronically Controlled Viscous Fan Drive", which is incorporated by reference herein.

TECHNICAL FIELD

The invention relates generally to fan drive systems and more specifically to an electronically controlled viscous fan drive.

BACKGROUND ART

The present invention relates to fluid coupling devices of the type including both fluid operating chamber and a fluid reservoir chamber, and valving which controls the quantity of fluid in the operating chamber.

Although the present invention may be used advantageously in fluid coupling devices having various configurations and applications, it is especially advantageous in a coupling device of the type used to drive a radiator cooling fan of an internal combustion engine, and will be described in connection therewith.

Fluid coupling devices ("fan drives") of the viscous shear type have been popular for many years for driving engine cooling fans, primarily because their use results in substantial saving of engine horsepower. The typical fluid coupling device operates in the engaged, relatively higher speed condition only when cooling is needed, and operates in a disengaged, relatively lower speed condition when little or no cooling is required.

For many years, one of the problems associated with fluid coupling devices used to drive radiator cooling fans has been the phenomenon known as "morning sickness". A typical viscous fan drive includes one or more fill openings, through which viscous fluid flows from the reservoir into the operating chamber, and one or more discharge openings through which fluid is pumped from the operating chamber back into the reservoir. After the fan drive has been operating for a period of time, and the engine is turned off, the fan drive ceases rotation. When the fan drive stops rotating, the orientation of the fill and discharge openings is completely unpredictable, i.e., the fill opening could be in the three o'clock position and the discharge opening could be in the nine o'clock position, in which case there would probably be relatively little "drain back" or "bleed back", i.e., a flow of fluid from the reservoir back into the operating chamber.

However, the fan drive could stop with the discharge opening in the six o'clock position and the fill opening in the twelve o'clock position, in which case the discharge opening would be beneath the level of fluid in the reservoir. When this situation occurs, it has been conventional for a certain amount of fluid to bleed back from the reservoir through the discharge opening, into the operating chamber. Then, when the operation of the fan would begin again, after a long period of time (for example, the next morning), with a substantial amount of fluid in the operating chamber, even though the engine was cold and not cooling was required, the fan drive would initially operate in the engaged condition for a period of time until most of the fluid in the operating chamber is pumped back into the reservoir. Unfortunately, such engaged operation results in an undesirable noise of the fan being driven when it is not required. It is this phenomenon, most common and perhaps most objectionable in the morning, which has been referred to as "morning sickness".

Several substantial improvements to overcome the problem of morning sickness have been developed by the assignee of the present invention, such solutions being described and illustrated in U.S. Pat. Nos. 4,312,433 and 5,101,950, both of which are assigned to the assignee of the present invention and incorporated herein. In both of the cited patents, the general approach to the problem of morning sickness has been to configure the discharge flow path (i.e., the path from the operating chamber, past the pump out means and back to the reservoir) such that fluid in the reservoir would be unable to flow backwards through the discharge path and into the operating chamber, regardless of the rotational orientation of the fan drive during periods of engine shut down.

Unfortunately, it has been observed that, even in the presence of anti-bleed back solutions in the above-cited patents, a certain amount of bleed back or drain back can still occur through the fill opening whenever, for example, the fan drive stops rotating with the fill opening is in the six o'clock position (i.e., below the fluid level) and the discharge opening in the twelve o'clock position. As is well known to those of skill in the art, the fill hole needs to be near the radially outer periphery of the reservoir chamber, in order to facilitate filling of the operating chamber, but then, the fill hole is even more likely to be well below the fluid level in the reservoir chamber. The bleed back through the fill opening can occur in one of three ways. First, if, as a result of manufacturing inaccuracies or otherwise, the valve arm does not seal tightly over the fill opening, bleed back will occur. Second, if the ambient air temperature around the fan drive is relatively high when the fan drive stops rotating, the valve arm will open (or remain open) and allow fluid to flow from the reservoir into the operating chamber. Third, an electronically controlled fan drive this is of the "fail-safe ON" type will have its valve opened when the electrical power is turned off.

One method for eliminating morning sickness is described in U.S. Pat. No. 6,085,881, which is assigned to the assignee of the present invention and incorporated herein. In this cited patent, an accumulator plate is provided that is attached to the cover and defines an accumulator chamber within the operating chamber. When the engine is turned off, any fluid draining from the reservoir back through the fill hole is contained within the accumulator chamber and prevented from flowing directly into the viscous shear chamber. After the engine is started, fluid flows back from the accumulator chamber and fills the shear chamber in the normal manner.

However, the weakness with this design is that an accumulator plate is needed to close the accumulator and reservoir. This is a potential leakage point. Further, the location of the accumulator requires back side machining that adds to the cost of the fan drive.

It is thus highly desirable to provide a viscous shear plate that further eliminates leakage points and eliminates costly machining.

SUMMARY OF THE INVENTION

The present invention addresses some of the issues described above by providing an electronically controlled viscous fan drive system in which the output drive to the fan is electronically controlled by the movement of viscous fluid from a fluid reservoir and into the operating and working chamber of the coupling during normal operation. A radially balanced valve disk coupled to a spring and an actuator electronically controls movement of viscous fluid from the reservoir to the antibleedback chamber through the fill holes by energizing or deenergizing the spring based on engine operating conditions.

The valve controls the relative movement of viscous fluid by sealingly engaging and disengaging a fill hole and allowing viscous fluid to move from a cold pump out slot through the fill hole to the drive groove area. This controls the amount of torque created to drive the output coupling member at a given input speed.

The clutch plate and cover, along with the features defined between the clutch plate and cover (cold pump out slot, fill hole, and drive groove area), are cast to the desired size and shape, therein allowing easier and more precise manufacturing and more cost effective manufacturing as compared with traditional designs that are stamped and having machined-in features. In alternative arrangements, the housing member is also or alternatively cast with features corresponding to the input coupling member that are used in driving the output drive.

In one preferred embodiment, the valve is arranged in a disengaged position, where the valve covers the fill hole, in the absence of electrical activation. This prevents the engagement of the fan unless specifically requested by the controller to provide cooling to the engine. In this preferred embodiment, fuel economy and emissions are maximized by only engaging the fan as necessary.

Alternatively, in another preferred embodiment, the valve is arranged in a failsafe-engaged position, and thus maintains viscous flow to drive the fan even in the absence of electrical actuation. This may prevent engine damage associated with high heat in the event that electrical power fails or in the event that the controller is inoperative.

Other features, benefits and advantages of the present invention will become apparent from the following description of the invention, when viewed in accordance with the attached drawings and appended claims.

BEST MODE(S) FOR CARRYING OUT THE INVENTION

Referring now to the drawings, which are not intended to limit the invention, FIGS. 1-5 illustrates one preferred form of a fluid coupling device 10 ("viscous fan drive") of a type utilizing the present invention. The fluid coupling device 10 includes a die-cast input coupling member, or clutch, generally designated 11, and an output coupling member, generally designated 13. The assembly 13 includes a die-cast housing member (body) 15, and a die-cast cover member (enclosure) 17, the members 15 and 17 being secured together by a rollover of the outer periphery of the cover member 17, as is well known in the art.

The fluid coupling device 10 is adapted to be driven by a liquid cooled engine, and in turn, drives a radiator-cooling fan, neither of which are shown herein. The fan may be attached to the housing member 15 by any suitable means, such as is generally well known in the art, and as is illustrated in the above-incorporated patents. It should be understood, however, that the use of the present invention is not limited to any particular configuration of fluid coupling device, or fan mounting arrangement, or any particular application for the fan drive, except as is specifically noted hereinafter. For example, the present invention could be used with a fan drive of the type adapted to have the radiator cooling fan attached to the cover member, rather than to the body member.

Figure 2:
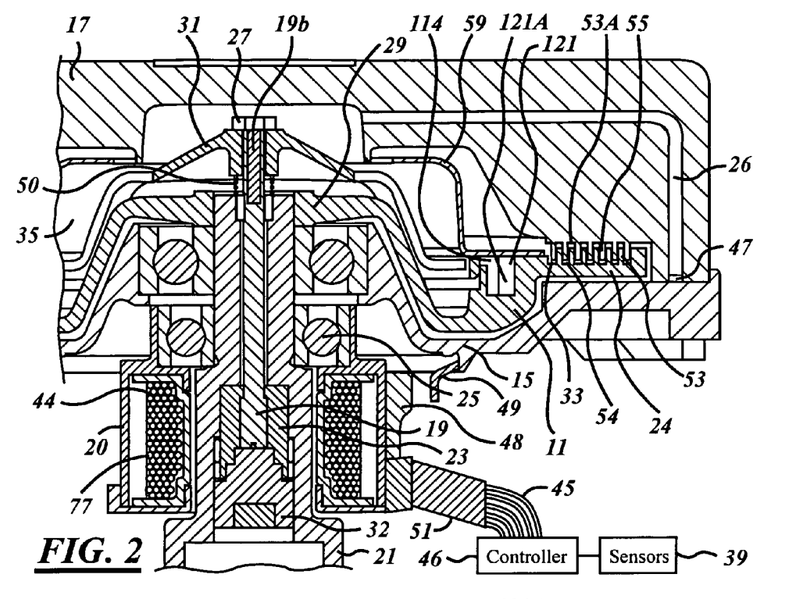
FIG. 2 is a section view of FIG. 1 taken along line 2-2 showing the fluid coupling device in a disengaged position.
Figure 3:
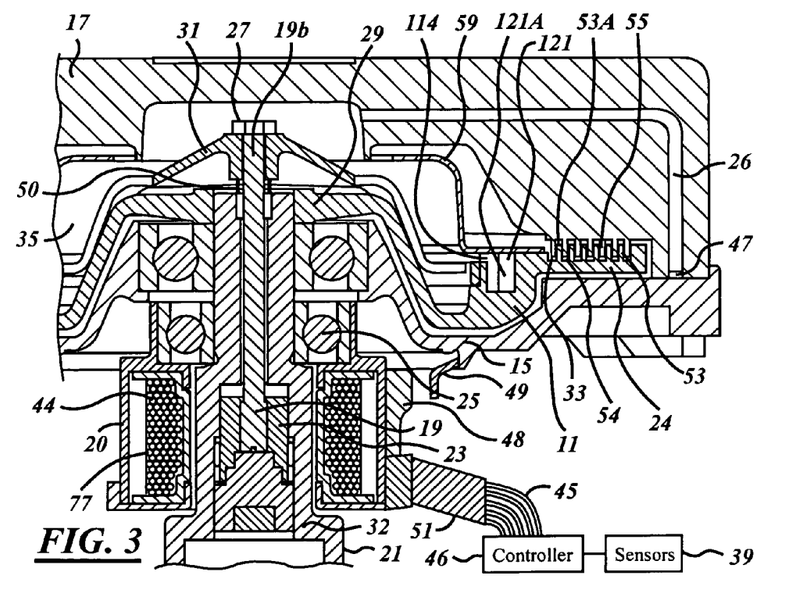
FIG. 3 is a section view of FIG. 1 taken along line 2-2 showing the fluid coupling device in a fully engaged position.

As best shown in FIGS. 2 and 3, the coupling device 10 includes an input coupling assembly 38 on which the input coupling member 11, or clutch, is mounted. The input coupling assembly 38 is rotatably driven, such as by means of an hexagonal, internally threaded portion 21, which would typically be threaded onto an externally threaded shaft extending from the engine water pump. The assembly 38 functions as a support for the inner race of a bearing set 25, which is seated on the inside diameter of the housing member 15. The forward end 19*b* of the actuator shaft 19 has an interference fit between the assembly 38 and an opening defined by a hub portion 29 of the input coupling member 11. As a result, rotation of the assembly 38 causes rotation of the actuator shaft 19 and input coupling member 11. An armature 23 is also coupled to a portion of the armature shaft 19, which is kept in place within the assembly 38 by a plug 32.

The housing member 15 and the cover member 17 cooperate to define a fluid chamber, which is separated by means of a substantially circular valve disk 31 and reservoir cover 59, into a fluid operating chamber 33 and a fluid reservoir chamber 35. The valve disk 31 is operatively coupled with the forward end 19*b* of the actuator shaft 19 by screw 27 and is disposed within the reservoir cover 59 and the input coupling member 11. The cover member 17 and the input coupling member 11 define the fluid operating chamber 33, while the reservoir cover 59 and the input coupling member 11 define the fluid reservoir 35.

The input-coupling member 11 includes a plurality of annular lands 53 that are located outwardly from the hub 29. The adjacent surface of the cover member 17 includes a plurality of corresponding annular lands 55. The annular lands 53, 55 are interdigitated to define a serpentine-shaped viscous shear space 54 therebetween. It is believed that in view of the above-incorporated U.S. patents, those skilled in the art can fully understand the construction and operation of the fluid-coupling device illustrated in FIGS. 1-5, as well as the various flow paths for the viscous fluid.

Figure 4:
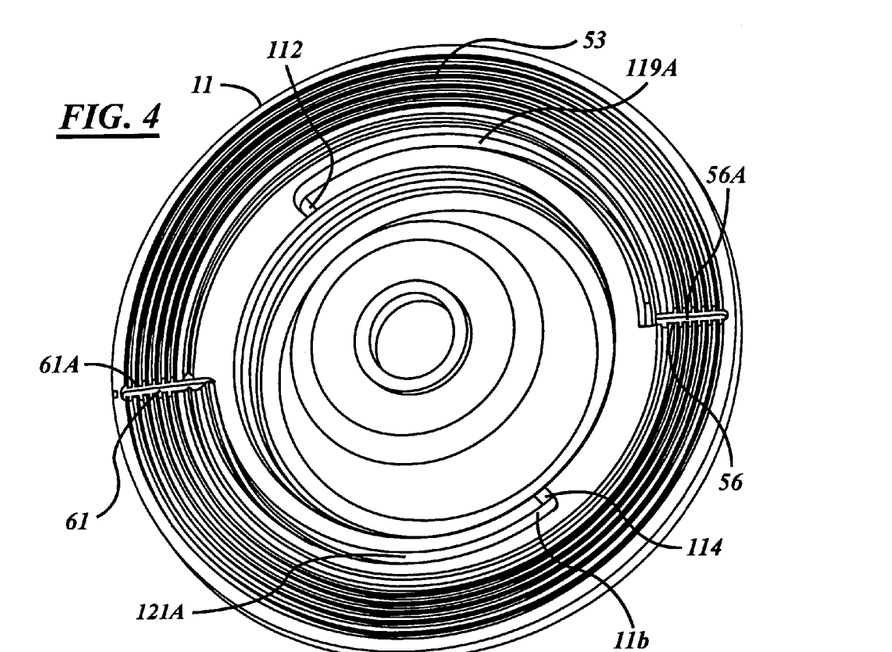
FIG. 4 is a perspective view of the one side of the clutch according to a preferred embodiment of the invention.
Figure 5:
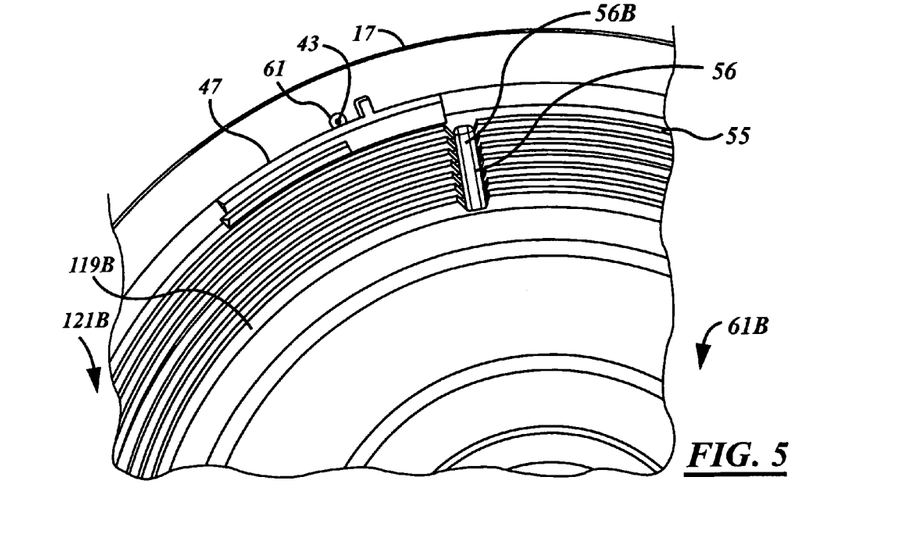
FIG. 5 is a perspective view of the cover member and wiper according to a preferred embodiment of the present invention.

As best seen in FIGS. 4 and 5, the clutch 11 and cover member 17 are cast, using conventional die-casting techniques, to include a number of features that relate directly to the engagement of the fan drive 10. Die-casting is a well-known process in which molten metal or metal alloys are injected into a mold under high pressure. The mold contains the features desired within the part. One preferred molten material for use in the present invention is a general purpose die cast aluminum alloy having good casting characteristics such as BorgWarner's ES-01002 aluminum alloy (which has a Tensile Strength of about 325 Megapascals, a Yield Strength of about 160 Megapascals, and elongation of about 3.5%), which is introduced to the mold at around 650 degrees Fahrenheit and at a pressure between about 10 and 210 Megapascals. The parts are cooled and the mold is opened, there forming the part having the desired features. The formed part is more uniform than machined parts, and generally has good surface finish and dimensional accuracy.

For the clutch 11 and cover member 17, the features that are incorporated within the die cast mold include pair of drive grooves 56A, 56B and 61A, 61B cast into of a portion of the respective lands 53, 55 and forming a respective fluid passage 56, 61 there between to the working chamber 35 defined between the respective lands 53, 55. The clutch 11 also included a pair of cold pump out slots 119A, 121A defined between the rollover 53A and a sealing surface 123. The reservoir cover 59 seals onto the top of the sealing surface 123 and top of the rollover 53A. The slots 119A and 121A and reservoir cover 59 therefore define a passageways 119 and 121, respectively. The passageways 119, 121, being oriented 180 degrees around the outer periphery of the cover 17 and clutch 11 act as an antidrainback chamber when the cover 17 is not rotating (i.e. when the fan drive is disengaged), therein minimizing morning sickness that typically occurs in viscous type clutch systems.

The cover 17 and clutch 11 also define a pair of fill holes 112, 114. The fill holes 112, 114 are preferably disposed 180 degrees around the periphery of the cover 17 and clutch 11 with respect to one another and are located at the junction between the reservoir chamber 35 and the respective passageways 119, 121. As will be described in further detail below, the fill holes 112, 114 may be opened or covered (i.e. closed), depending upon the relative positioning of the valve disk 31 relative to the fill holes 112, 114, to control the amount of viscous fluid entering the working chamber 33 and shear space 54 through the slots 119, 121 and grooves 56, 61. The amount of viscous fluid contained between the lands 53, 55, within the shear space 54, together with the rotational speed of the clutch 11, controls the relative engagement of the cover member 17.

The cover member 17 also includes a pumping element 47, also referred to as a "wiper" element, operable to engage the relatively rotating fluid in the shear space 54, and generate a localized region, or scavenge area 43 of relatively higher fluid pressure. As a result, the pumping element 47 continually pumps a small quantity of fluid from the shear space 54 back into the reservoir chamber 35 through a scavenge hole 61 coupled to a radial passage 26 defined by the cover member 17, in a manner well known in the art.

By casting these features into the cover 17 and clutch 11, as opposed to stamping the cover and clutch and machining in the features as in prior art arrangements, substantial improvements that lead to substantial cost savings in terms of manufacturing and repeatability, which leads to improved quality. Cast in features have less variability part to part, leading to improved part performance and also reducing costs in terms of scrap. Further, cast-in features are done in one operating step, as opposed to a separate stamping and machining step, which leads to further manufacturing savings in terms of labor costs and time.

Figure 1:
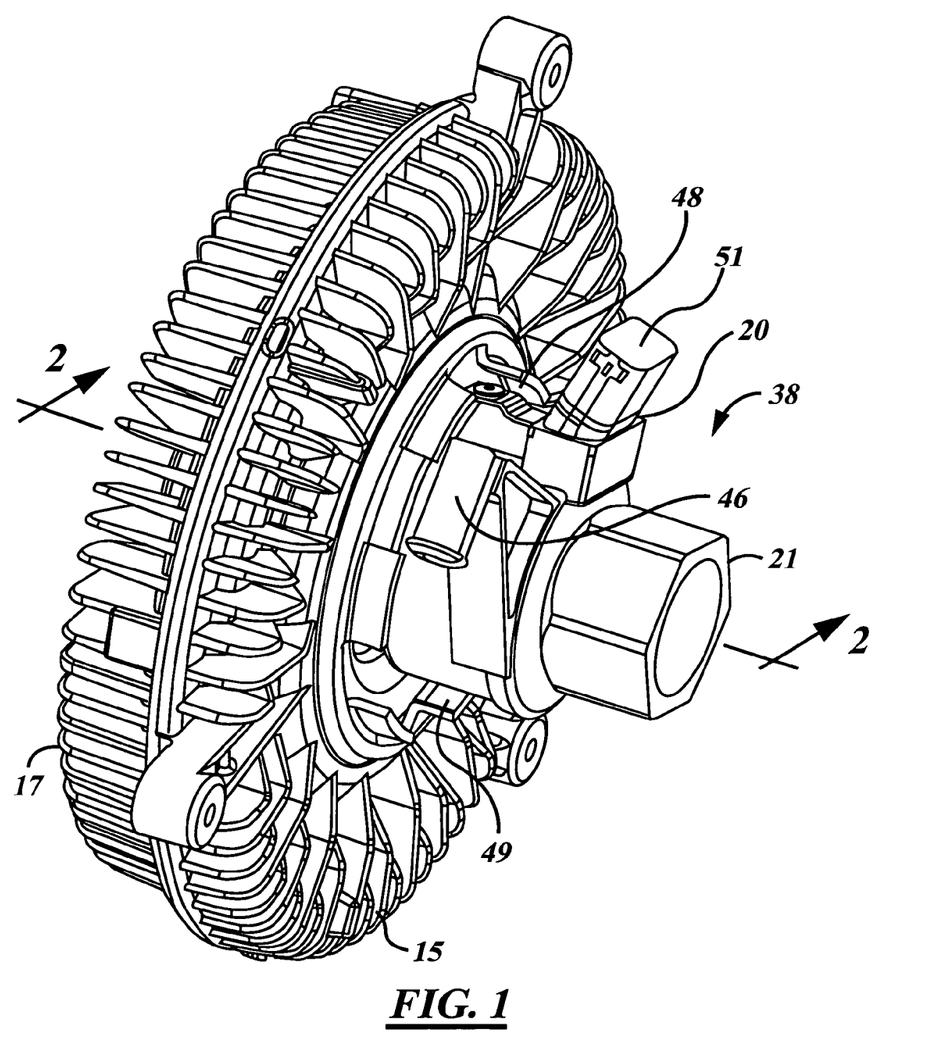
FIG. 1 is a perspective view of a fluid coupling device according to one preferred embodiment of the present invention in the disengaged position.

Referring now to FIGS. 1-3, the actuator subassembly 20 includes a plurality of coils 77 contained within a bobbin 44. The coils 77 are electrically coupled to an external controller 46 through wires 45 contained within an electrical connector 41 coupled to the bobbin 44. The external controller 46 is also electrically coupled to a Hall effect sensor 48 through connector 51. The Hall effect sensor 48 senses the rotational speed of the housing member 15 via one or more pole pieces 49 coupled to the housing member 15 and sends an electrical impulse to the controller 46 as a function of the measured rotational speed. A plurality of other sensors 39, including, for example, an engine temperature sensor, are also electrically connected to the controller 46 and provide electrical signals regarding a particular engine operating parameter.

The controller 46 interprets the electrical signals from the hall effect sensor 48 and other sensors 39 and sends an electrical signal to the coils 77 to control the relative positioning of the valve disk 31 to control the relative engagement or disengagement of the input coupling device 11.

As may be best seen in FIG. 2, when the coupling device 11 is rotating and in the disengaged position, a spring 50 biases the valve disk 31 to cover the fill holes 112, 114, and hence substantially all of the viscous fluid in the device 10 is contained within the fluid reservoir chamber 35. The spring, as shown in FIGS. 2 and 3, is coupled along the outer periphery of the actuator shaft 19 and between the valve disk 31 and the hub 29. In the disengaged position, no viscous fluid is contained within the operating chamber 54 to drive cover member 17. In FIG. 3, when the coupling device 11 is rotating and in the fully engaged position, viscous fluid flow freely through the respective fill hole 112, 114 to the operating chamber 33 to drive the coupling member 11 as a function of the given input speed and amount of viscous fluid contained in the shear space 54. Each is described in further detail below To engage the fan drive, as shown in FIG. 3, the external controller 46 sends an electrical signal through the actuator subassembly 20 to the electrical coil 77, therein creating a magnetic flux through the input coupling assembly 38 within the viscous fan drive 10. The actuator 23, which is metallic, reacts in response to the magnetic flux to axial move in a direction away from the spring 50 (i.e. moving in a direction against the spring 50 (downward in FIG. 3)). As the actuator shaft 19 (and actuator coupling assembly 38) and valve disk 31 are coupled to the actuator 23, they are pulled downward as well, thereby causing valve disk 31 to unseal from the reservoir cover 59 and uncover the cast in fill hole 112, 114, thereby allowing the movement of viscous fluid from the reservoir chamber 35 to the operating chamber 33 through the respective slots 119, 121 and grooves 56, 61. This viscous fluid then enters the shear space 54 between the set of respective lands 53, 55. This causes slippage between the input coupling member 11 and the cover member 17, thereby driving the cover member 17 as a function of the input speed to the input-coupling member 11 and as a function of the amount of viscous fluid contained in the shear space 54, as is understood by those of ordinary skill in the art. This is the so-called engaged position, as shown in FIG. 3.

By decreasing the amount of power to the actuator 20, and hence magnetic flux available to pull the actuator 23 downward, the spring 50 biases back towards its natural position (i.e. upward relative to FIGS. 2 and 3), thereby urging the valve disk 31 back towards the reservoir cover 59 to partially cover the fill hole 112, 114. This allows viscous fluid to enter the operating chamber 33 through the fill hole 112, 114, but at a rate less than the fully engaged position. This is the so-called mid-range or partially engaged position. In this position, the cover member 17 rotates at a rate slower than the fully engaged position as a function of the relatively lesser amount of viscous fluid entering the shear space 54.

In the absence of electrical actuation, as shown in FIG. 2, the spring 50 urges the valve disk 31 to seal against the reservoir cover 59 and cover the fill hole 112, 114. This prevents viscous fluid from entering the operating chamber 54, and therein prevents the viscous engagement of the cover member 17 as a result. A portion of the viscous fluid is maintained in the cold pump out slots 119, 121 to prevent morning sickness upon subsequent engagement.

The amount of electrical power supplied in terms of pulse width modulation from the external controller 46 and power source, and hence the amount of magnetic flux created to drive the actuator 23 rightward in response, is determined by the external controller 46. The controller receives a set of electrical inputs from various engine sensors 38, and Hall effect sensor 48. When the controller 46 determines that one or more of these sensors is sensing an engine operating conditions outside the desired range, the external controller 46 and power source will send electrical signal to the coil 77. Thus, for example, if the external controller 46 determines that the engine coolant temperature is too high as measured by sensor 39, a signal may be sent from the controller 46 to the actuator subassembly 20 to activate the coil 77 to a desired pulse width, therein driving the actuator 23 away from spring 50 to partially or fully close the valve disk 31 over fill holes 112, 114.

Of course, as one of skill in the art appreciates, the actual amount of pulse width modulation necessary to move the valve 31 between a fully engaged and disengaged position is dependent upon many factors. For example, the size and shape of the spring 50 itself is a major factor is the amount of pulse width modulation necessary to move the actuator 23. A stiffer or larger spring 50 may require a larger pulse width to achieve a similar biasing of the spring 50 as compared with a more flexible or smaller spring.

Further, the size of the fill holes 112, 114 may affect the amount of biasing necessary. For example, clutch 11 with larger fill holes 112, 114 may only require the valve disk 31 to slightly uncover one or both of the fill holes 112, 114 in order to provide adequate viscous fluid flow to the working chamber.

Figure 6:
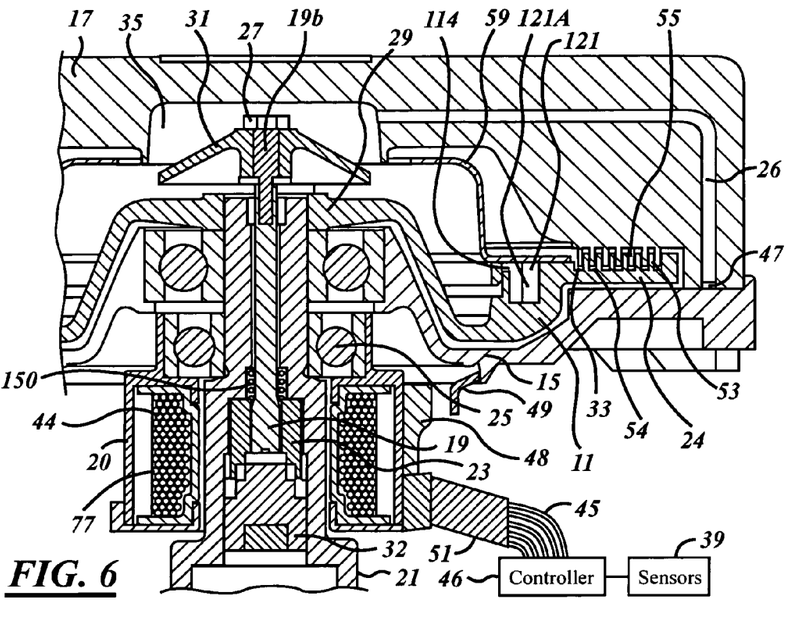
FIG. 6 is a section view of a fluid coupling device according to another preferred embodiment of the present invention in a fully disengaged position.
Figure 7:
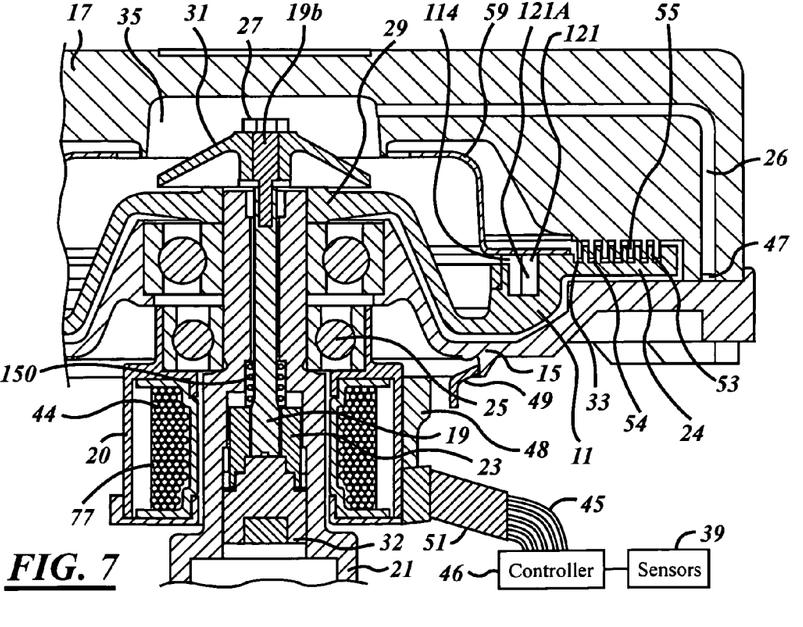
FIG. 7 is a section view of the fluid coupling device of FIG. 6 in a fully engaged position.

In another alternative arrangement, as shown in FIGS. 6 and 7, the fluid coupling device 10 is provided in a failsafe engaged position, as opposed to the disengaged position as shown in the embodiment described in FIGS. 1-5.

Referring now to FIGS. 6 and 7, the design of the fluid coupling device is substantially similar to that in FIGS. 1-5, except that the location of the return spring 150 is moved between the actuator shaft 19 and the assembly 38 and partially coupled to the armature 23. The spring 150, in its natural position in FIG. 7, pushes the actuator 23 towards the plug 32. This in turn pulls the actuator shaft 19 and valve disk 31 towards the plug, which uncovers the valve disk from the respective fill holes 112, 114. In this embodiment, the spring 150 is positioned between the inner periphery of the actuator shaft 19 and is the actuator 23, as opposed to between the hub 29 and valve disk 31 as in FIGS. 1-3.

As shown in FIG. 6, when the controller 46 sends a pulse width signal to the coils 77 to create a magnetic flux, the actuator 23 moves upward against the spring 150 in response, therein moving the valve disk 31 towards the reservoir cover 59 to partially close or close the fill holes 112, 114, therein preventing viscous fluid from entering the working chamber 33 and shear space 54 to disengage the drive.

Thus, in the embodiment as shown in FIGS. 6 and 7, in the absence of electrical actuation, the fluid coupling device is maintained in an engaged position, which allows viscous fluid to pass from the reservoir chamber 35 to the working chamber 33. This prevents engine damage associated with overheating that may result if electrical power to the coils 77 is compromised.

The present invention offers many improvements over previous fluid coupling devices 10. First and foremost, the present invention is instantaneously controllable by simply energizing or deenergizing the coil 77 to move the valve 31 to cover or uncover the fill holes 112, 114 depending upon the relative arrangement. This can lead to improved fuel economy and emissions and can prevent damage to the engine due to overheating.

Further, by casting in the features into the clutch 11 and cover 17, the present invention simplifies the manufacturing operations by providing a more robust and repeatable design and also minimizes costs associated with scrap that are typically realized in stamping and machining operations.

Also, in the alternative preferred arrangement of the components in FIGS. 6 and 7, the fluid coupling device is set in a failsafe engaged position, thereby protecting engine components by maintaining viscous fluid in the working chamber 54 during electrical outages or actuator 20 malfunctions.

In an alternative version of the present invention, additional lands could be formed at the end of the input coupling member 11 opposite the lands 53 that are coupled in a serpentine fashion with lands cast into the housing 15 to provide a second viscous shear space for driving the output coupling device 13. In other alternative versions, the lands 53, 55 could be removed between the cover 17 and input coupling member, and replaced by lands formed between the housing 15 and input coupling member 11 to drive the output coupling member 13 and still fall within the spirit of the present invention. In these two alternative versions, the various features in the input coupling member 11 and housing 15 are cast in a similar manner as described above.

While the invention has been described in connection with one embodiment, it will be understood that the invention is not limited to that embodiment. On the contrary, the invention covers all alternatives, modifications, and equivalents as may be included within the spirit and scope of the appended claims.

What is claimed is:

1. An electronically controlled viscous fan drive used on an internal combustion engine comprising:
   a cast output coupling member including a housing member coupled to a cover member;
   an actuator shaft partially disposed within said cast output coupling member;
   a cast input coupling assembly coupled to said actuator shaft and substantially contained within said cast output coupling member, said cast input coupling assembly capable of rotating at a given input speed,
   a reservoir cover coupled within said output coupling member and sealingly engaged to said cast input coupling member;
   a pair of cold pump out slots defined by said reservoir cover and said cast input coupling member;
   a fluid reservoir chamber defined by said reservoir cover and said cast input coupling member;

a quantity of viscous fluid contained within said fluid reservoir chamber;

a pair of fill holes, each of said pair of fill holes defined between a respective one of said pair of cold pump out slots and said fluid reservoir chamber;

a fluid operating chamber defined by said cast input coupling member and said cover member, said fluid reservoir chamber fluidically coupled to said fluid operating chamber through said pair of cold pump out passageways, said fluid operating chamber further being fluidically coupled to said fluid reservoir chamber through a radial passage defined within said housing member;

a valve disk coupled to said actuator shaft and disposed between said input coupling member and said reservoir cover, said valve disk being closely coupled with said pair of fill holes and controlling said amount of said viscous fluid entering said fluid operating chamber from said fluid reservoir chamber through said cold pump out passageways and through said pair of fill holes, wherein said amount of viscous fluid within said fluid operating chamber and said given input speed define an output rotational speed of said cast output coupling member;

an actuator coupled around a portion of said actuator shaft, said actuator capable of axial movement along the length of said input coupling assembly in response to said magnetic flux to position said valve disk relative to said pair of fill holes between an engaged position, a partially engaged position, or in a disengaged position;

a spring coupled along said actuator shaft and biasing said valve disk in a first position in the absence of said magnetic flux from said actuator, said first position selected from the group consisting of said engaged position and said disengaged position;

wherein said engaged position is characterized such that said valve disk is positioned wherein said pair of fill holes are not covered by said valve disk, therein allowing maximum flow of said viscous fluid from said fluid reservoir chamber to said fluid operating chamber to drive said output coupling member at a maximum rotational speed at said given input speed;

wherein said disengaged position is characterized is characterized such that said valve disk is positioned wherein said pair of fill holes are covered by said valve disk to prevent flow of said amount of viscous fluid from said fluid reservoir chamber to said fluid operating chamber; and wherein said partially engaged position is characterized such that said valve disk is positioned wherein said pair of fill holes are partially covered by said valve disk to allow a limited amount of said viscous fluid to flow from said fluid reservoir chamber to said fluid operating chamber to drive said output coupling member at a rotational speed less than said maximum rotational speed.

2. The fan drive of claim 1 further comprising:

an external controller; and an electrical coil electrically coupled to said external controller, said electrical coil capable of being electrically activated by said external controller to generate a magnetic flux, wherein a relative increase in amount of said magnetic flux thereby causing the movement of said actuator away from said spring in response to said relative increase and wherein a relative decrease in said amount of magnetic flux causes the movement of said actuator towards said spring in response to said relative decrease.

3. The fan drive of claim 2 further comprising at least one sensor input electrically coupled to said external controller, said at least one sensor input capable of sensing the temperature of the internal combustion engine, wherein said external controller interprets said sensed temperature to determine the amount of electrical signal to send to said electrical coil in response to said sensed engine operating condition to maintain said engine in a desired operating range.

4. The fan drive of claim 1, wherein said first position comprises said engaged position.

5. The fan drive of claim 4, wherein said spring is coupled between said valve disk and a hub portion of said cast input coupling assembly.

6. The fan drive of claim 1, wherein said first position comprises said disengaged position.

7. The fan drive of claim 6, wherein said spring is coupled between said actuator shaft and said armature.

8. The fan drive of claim 1, wherein said cast input coupling assembly comprises a cast input coupling member comprising:

a hub portion, a plurality of input annular lands located outwardly from said hub portion;

a pair of input drive grooves coupled within a portion of said plurality of input annular lands; and a pair of input cold pump out slots disposed between said plurality of annular lands and said hub portion.

9. The fan drive of claim 8, wherein said housing member comprises a cast housing member comprising:

a plurality of housing member annular lands, said plurality of housing member annular lands and said plurality of input annular lands defining a shear space therebetween;

a pair of housing member drive grooves coupled within a portion of said plurality of housing member annular lands, each of said pair of housing member drive grooves corresponding to a respective one of said pair of input drive grooves of said input coupling member and forming a respective drive groove; and a pair of housing member cold pump out slots, each of said pair of housing member cold pump out slots corresponding to a respective one of said pair of input cold pump out slots to define a cold pump out passageway therebetween.

10. The fan drive of claim 8, wherein said housing member comprises a cast cover member comprising:

a plurality of cover member annular lands, said plurality of cover member annular lands and said plurality of input annular lands defining a shear space therebetween;

a pair of cover member drive grooves coupled within a portion of said plurality of housing member annular lands, each of said pair of cover drive grooves corresponding to a respective one of said pair of input drive grooves of said input coupling member and forming a respective drive groove; and a pair of cover member cold pump out slots, each of said pair of cover member cold pump out slots corresponding to a respective one of said pair of input cold pump out slots to define a cold pump out passageway therebetween.

11. A method for forming an electronically controlled viscous fan drive comprising:
(a) casting an input coupling assembly comprising:
a hub portion,
a plurality of input annular lands located outwardly from said hub portion,
a pair of input drive grooves coupled within a portion of said plurality of input annular lands, and
a pair of input cold pump out slots disposed between said plurality of annular lands and said hub portion;
(b) casting a cover member comprising:
a plurality of cover member annular lands,
a pair of cover member drive grooves coupled within a portion of said plurality of cover member annular lands, and
a pair of cover member cold pump out slots;
(c) casting a housing member;
(d) coupling a housing member to an actuator shaft;
(e) coupling said cast input coupling assembly to an actuator shaft such that said plurality of input annular lands and said plurality of cover member annular lands define a shear space therebetween and further such that each of said plurality of cover member drive grooves and a respective one of said input drive grooves define a drive groove therebetween and further such that each of said pair of cover member cold pump out slots and said respective one of said pair of input cold pump out slots form a cold pump out passageway therebetween;
(f) coupling a valve disk to said actuator shaft;
(g) coupling a reservoir cover onto said actuator shaft;
(h) coupling a spring near said actuator shaft, said spring biasing said valve disk in a first position, said first position selected from the group consisting of an engaged position and a disengaged position;
(i) coupling an actuator subassembly along said actuator shaft, said actuator subassembly including a plurality of coils;
(j) coupling an actuator between said actuator shaft and said actuator subassembly, said actuator capable of moving actually along the length of said actuator shaft in response to an increasing amount of strength of a magnetic flux generated from electrically activating said plurality of coils, thereby causing said valve disk to be moved from said first position to a second position in response to said movement of said actuator, said second position selected from the group consisting of an engaged position, a disengaged position, and a partially engaged position, said first position not equal to said second position;
(k) coupling said cover member to said housing member such that said input coupling member, said valve disk, and said reservoir cover are substantially contained within said cover member and said housing member;
(l) introducing a quantity of viscous fluid to a fluid reservoir chamber, said fluid reservoir chamber defined by said reservoir cover and said cast input coupling member; and
(m) electrically coupling said plurality of coils to an external controller.

12. The method of claim 11, wherein (h) coupling a spring comprises (g) coupling a spring between said hub portion and said valve disk, said spring biasing said valve disk in an engaged position, wherein said engaged position allows said quantity of viscous fluid to flow from a fluid reservoir chamber to a fluid operating chamber,
wherein said fluid reservoir chamber is defined by said reservoir cover and said cast input coupling member and wherein said fluid operating chamber is defined by said cast input coupling member and said cover member.

13. The method of claim 11, wherein (h) coupling a spring comprises (g) coupling a spring between said actuator shaft and said armature, said spring biasing said valve disk in a disengaged position, wherein said disengaged position prevents said quantity of viscous fluid to flow from a fluid reservoir chamber to a fluid operating chamber,
wherein said fluid reservoir chamber is defined by said reservoir cover and said cast input coupling member and wherein said fluid operating chamber is defined by said cast input coupling member and said cover member.

14. The method of claim 11, wherein (a) casting an input coupling assembly comprises (a) casting an input coupling assembly having a first side and a second side, said first side located adjacent said cover member and said second side located adjacent said housing member when said input coupling assembly is coupled to said actuator shaft, said input coupling assembly having:
a hub portion,
a first plurality of input annular lands located outwardly from said hub portion on said first side,
a second plurality of input annular lands located outwardly from said hub portion on said second side,
a first pair of input drive grooves coupled within a portion of said first plurality of input annular lands,
a second pair of input drive grooves coupled within a portion of said second plurality of input annular lands,
a first pair of input cold pump out slots disposed between said first plurality of annular lands and said hub portion, and
a second pair of input cold pump out slots disposed between said second plurality of annular lands and said hub portion.

15. The method of claim 14, wherein (c) casting a housing member comprises (c) casting a housing member comprising:
a plurality of housing member annular lands,
a pair of housing member drive grooves coupled within a portion of said plurality of housing member annular lands, and
a pair of housing member cold pump out slots.

16. The method of claim 15, wherein (e) coupling said cast input coupling assembly to an actuator shaft comprises (e) coupling said cast input coupling assembly to an actuator shaft such that said first side is closely coupled to said cover member a said second side is closely coupled to said housing member,
wherein said first plurality of input annular lands and said plurality of cover member annular lands define a first shear space therebetween and further such that each of said first plurality of input drive grooves and a respective one of said cover member drive grooves define a first drive groove therebetween and further such that each of said first pair of cover member cold pump out slots and said respective one of said pair of input cold pump out slots form a first cold pump out passageway therebetween;
wherein said second plurality of input annular lands and said plurality of housing member annular lands define a second shear space therebetween and further such that each of said first plurality of input drive grooves and a respective one of said housing member drive grooves define a first drive groove therebetween and further such that each of said first pair of housing member cold pump out slots and said respective one of said pair of input cold pump out slots form a second cold pump out passageway therebetween.

17. The method of claim 11, wherein (a) casting an input coupling member comprises:

providing a die cast mold corresponding to the input coupling member and including a hub portion, a plurality of input annular lands located outwardly from said hub portion, a pair of input drive grooves coupled within a portion of said plurality of input annular lands, and a pair of input cold pump out slots disposed between said plurality of annular lands and said hub portion;

introducing a quantity of molten material to said die cast mold at a first pressure;

cooling said quantity of molten material within said die cast mold; and removing the input coupling member from said die cast mold.

18. The method of claim 17, wherein introducing a quantity of molten material comprises introducing a quantity of molten aluminum alloy to said die cast mold at a pressure between about 10 and 210 Megapascals.

19. The method of claim 11, wherein (b) casting a cover member comprises:

providing a die cast mold corresponding to the cover member and including a plurality of cover member annular lands, a pair of cover member drive grooves coupled within a portion of said plurality of cover member annular lands, and a pair of cover member cold pump out slots;

introducing a quantity of molten material to said die cast mold at a first pressure;

cooling said quantity of molten material within said die cast mold; and removing the input coupling member from said die cast mold.

20. The method of claim 19, wherein introducing a quantity of molten material comprises introducing a quantity of molten aluminum alloy to said die cast mold at a pressure between about 10 and 210 Megapascals.

* * * * *